United States Patent
Bossler et al.

(10) Patent No.: US 8,095,270 B2
(45) Date of Patent: Jan. 10, 2012

(54) VEHICLE SAFETY SYSTEM

(75) Inventors: Hans-Juergen Bossler, Muenster (DE); Christian Bollinger, Aschaffenburg (DE); Guido Hirzmann, Sailauf (DE); Heinz-Joerg Lefringhausen, Mainhausen (DE); Volker Stegmann, Aschaffenburg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 2331 days.

(21) Appl. No.: 10/869,685

(22) Filed: Jun. 16, 2004

(65) Prior Publication Data

US 2004/0267422 A1    Dec. 30, 2004

(30) Foreign Application Priority Data

Jun. 26, 2003   (DE) .................................. 203 09 877

(51) Int. Cl.
*G06F 7/00*   (2006.01)

(52) U.S. Cl. ............... 701/41; 701/45; 701/46; 701/36; 280/735; 340/666; 340/667

(58) Field of Classification Search .............. 701/36, 701/45–46, 41; 340/666–667; 280/735
See application file for complete search history.

(56) References Cited

U.S. PATENT DOCUMENTS

| | | | | |
|---|---|---|---|---|
| 3,585,626 A * | 6/1971 | Tartarini | ...................... | 180/272 |
| 4,210,905 A * | 7/1980 | Coons | ........................... | 340/575 |
| 4,706,072 A * | 11/1987 | Ikeyama | ...................... | 340/576 |
| 5,453,929 A * | 9/1995 | Stove | ............................... | 701/1 |
| 5,722,686 A | 3/1998 | Blackburn et al. | | |
| 6,020,812 A * | 2/2000 | Thompson et al. | ........... | 340/438 |
| 6,116,778 A * | 9/2000 | Faust et al. | ..................... | 374/109 |
| 6,144,206 A * | 11/2000 | Goldfine et al. | ............. | 324/345 |
| 6,158,768 A | 12/2000 | Steffens, Jr. et al. | | |
| 6,218,947 B1 | 4/2001 | Sutherland | | |
| 6,254,127 B1 * | 7/2001 | Breed et al. | ................... | 280/735 |
| 6,326,593 B1 | 12/2001 | Bonn et al. | | |
| 6,796,578 B2 * | 9/2004 | White et al. | .................. | 280/735 |
| 6,910,711 B1 * | 6/2005 | Breed et al. | ................... | 280/735 |
| 7,019,623 B2 * | 3/2006 | Klausner et al. | ........... | 340/425.5 |
| 7,109,862 B2 | 9/2006 | Braeuchle et al. | | |
| 7,142,963 B2 * | 11/2006 | Borroni-Bird et al. | ......... | 701/41 |
| 2002/0008097 A1 | 1/2002 | Hobby | | |
| 2003/0018421 A1 * | 1/2003 | Cooper | .......................... | 701/45 |
| 2003/0189493 A1 * | 10/2003 | Klausner et al. | ............... | 340/575 |
| 2004/0267422 A1 * | 12/2004 | Bossler et al. | .................. | 701/41 |

FOREIGN PATENT DOCUMENTS

| | | |
|---|---|---|
| DE | 2229808 | 3/1974 |
| DE | 4136425 | 5/1993 |
| DE | 19545848 | 6/1997 |
| DE | 29712839 | 10/1997 |
| DE | 29802578 | 7/1998 |
| DE | 69209013 | 9/1998 |
| DE | 19802249 | 1/2000 |
| DE | 20007043 | 10/2000 |
| DE | 20013784 | 11/2000 |
| DE | 10027922 | 1/2002 |

(Continued)

*Primary Examiner* — Thomas Black
*Assistant Examiner* — Wae Louie
(74) *Attorney, Agent, or Firm* — Tarolli, Sundheim, Covell & Tummno LLP

(57) ABSTRACT

In a vehicle safety system with a vehicle steering wheel, which has a steering wheel rim, and with at least one capacitive sensor which detects an alteration to an electric or electromagnetic field, the sensor is arranged in or on the steering wheel rim.

1 Claim, 2 Drawing Sheets

FOREIGN PATENT DOCUMENTS

| | | |
|---|---|---|
| DE | 10048956 | 5/2002 |
| DE | 10121693 | 11/2002 |
| DE | 20309603 | 10/2003 |
| DE | 20309877 | 12/2003 |
| EP | 0437641 | 7/1991 |
| GB | 2319997 | 6/1998 |
| WO | 97/39920 | 1/1997 |

* cited by examiner

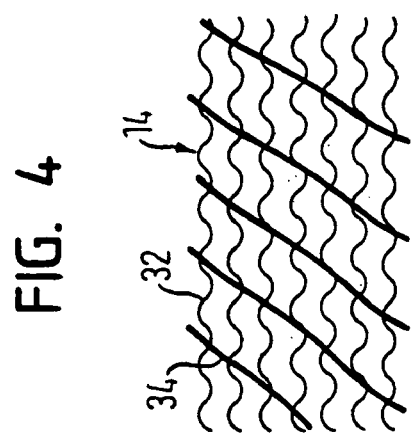
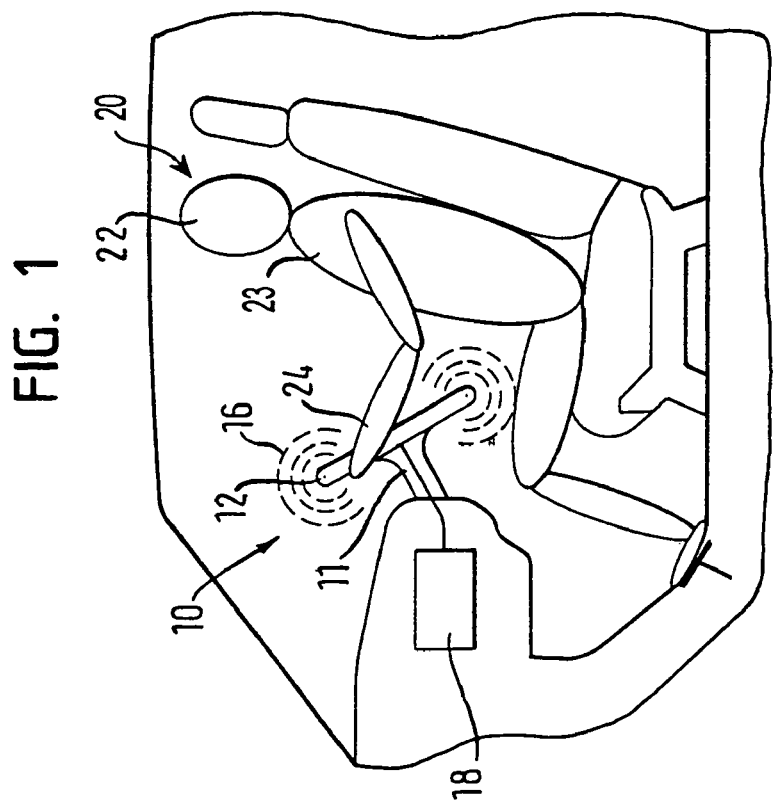

VEHICLE SAFETY SYSTEM

FIELD OF THE INVENTION

The invention relates to a vehicle safety system.

BACKGROUND OF THE INVENTION

Modern vehicle safety systems are acquiring increasingly as much current data as possible concerning the presence and position of vehicle occupants. Included in this, for example, is that a gas bag is only unfolded when the corresponding seat is also occupied, or else that the gas bag is not released when a child's seat is mounted on the passenger seat. A further important parameter is the distance of the vehicle occupant from the gas bag module, which influences the decision as to whether and, if so, to what intensity an inflation of the gas bag takes place in an accident. Another application which is gaining increasing importance is the monitoring of the driver's fitness to drive. In conceivable future applications, for example the vehicle could be automatically stopped or an emergency doctor could be informed if an unfitness to drive is established.

The sensor arrangement to receive the necessary data is of course to be as robust, as insensitive to breakdown and at the same time able to be manufactured and installed at as favourable a price as possible.

Here, capacitive sensors present themselves which, in quite general terms, detect an alteration to an electric or electromagnetic field, which is brought about by the person who is to be detected. With such sensors, objects can be differentiated from people, if necessary.

Basically, capacitive sensors and their application in vehicle safety systems are described for example in the U.S. Pat. No. 6,254,127 B1. There, a capacitive sensor is provided in the covering cap of a gas bag module arranged in the steering wheel.

BRIEF SUMMARY OF THE INVENTION

It is an object of the invention to improve a vehicle safety system.

According to the invention, in a vehicle safety system with a vehicle steering wheel, which has a steering wheel rim, and with at least one capacitive sensor which detects an alteration to an electric or electromagnetic field, the sensor is arranged in or on the steering wheel rim. In addition to the obvious advantage that the sensor can always remain connected with the steering wheel, this arrangement offers further advantages. Firstly, the grip of the driver on the steering wheel can be detected directly, so that information on this is always present as to how many hands the driver has on the steering wheel. As capacitive sensors can detect their target not only in direct close range but also up to a distance of over half a meter, if necessary even the distance of the driver from the steering wheel can be determined. In addition, it is possible to integrate the capacitive sensors in the steering wheel rim in a simple and favourably priced manner, without the driver being aware of them. The sensor position in the cap according to the U.S. Pat. No. 6,254,127 B1 is unfavourable in so far as the cap represents a component which is normally destroyed with the unfolding of the gas bag, so that the fixing and wiring of the sensor is costly. In addition, with such a sensor arrangement only a pure distance measurement can be realized.

Of course, the position of the hands on the steering wheel rim is also able to be determined by the invention.

It would be conceivable to use the information concerning the driver's holding of the steering wheel for example to control an autopilot function for example via a GPS system, which automatically takes over the control of the vehicle as soon as the driver lets go of the steering wheel or touches the steering wheel with his head or upper body. The autopilot function could be further constructed so that it switches itself off again as soon as the hands are on the steering wheel again.

Likewise, it is conceivable to store the information concerning the grip position or a non-holding of the steering wheel in a kind of "black box", similar to the recording apparatus used in airplanes, in order to facilitate the evaluation of possible causes of accidents. Thus, for example, it can be established subsequently that the driver was only steering with one hand or even had no hands on the steering wheel.

Preferably, several sensors are arranged in or on the steering wheel rim, whereby for example the detection of the hands on the steering wheel is facilitated and/or a more accurate measuring of distance or recognition of position for example of the upper body or of the head of the driver is made possible.

In a section in radial direction viewed in circumferential direction, several sensors can be arranged in or on the steering wheel rim. Several sensors can, however, also be arranged alternatively or additionally in a section perpendicular to the rotation axis of the steering wheel viewed in circumferential direction in or on the steering wheel rim.

The geometry of the steering wheel rim permits a variety of arrangements of sensors, so that the optimum configuration for the respective purpose of use is easy to realize.

Preferably, the sensor is arranged under a cover closing off the steering wheel rim to the exterior, forming the outer skin of the steering wheel rim. Capacitive sensors do not require any direct visual connection to the object which is to be detected, so that a foam or leather cover, which is arranged over the sensors, does not disturb the data aquisition. In this way, the one or several sensors can be hidden both visually and also haptically, so that they do not disturb the appearance of the steering wheel. Here, any type of covering suitable for cooperating with a capacitive sensor can be used, for example a foam layer, leather, fiberglass-reinforced plastic or wood.

In a preferred embodiment of the invention, the sensor is arranged above a cover surrounding a skeleton of the steering wheel, formed, for instance, by an injection molding or foaming around the skeleton. Preferably the sensor lies between the cover of the steering wheel skeleton and the cover of the steering wheel rim delimiting the steering wheel rim towards the exterior. Thereby, the one or several sensors are arranged closely under the surface of the steering wheel rim, but are protected by the outer cover.

The sensor may, for example, contain a flexible mat with elongated electric leads held therein. Preferably, the sensor contains a fleece mat. In this, for example, wires can be interwoven. The construction can therefore be arranged similar to a heating mat of known technology. Such a sensor is so flexible that it can be adapted without difficulty to the contour of the steering wheel rim. It can also be cut in any desired size and shape and arranged on the steering wheel rim. Not least, such a sensor construction is extremely favourably priced.

The sensor could also be formed by at least one section of a steering wheel heating arrangement.

By means of the capacitive sensors arranged on the steering wheel rim, a vehicle safety system can be realized in which a gas bag system and a control unit are provided, the gas bag system being controlled by means of the control unit as a function of the data acquired by the sensor, in order for example to decide to which intensity the gas bag system is to respond in an accident. Likewise, a system can be realized which detects the number and position of the hands of the driver on the steering wheel.

A position of a vehicle occupant could be determined by means of the data acquired by the sensor.

BRIEF DESCRIPTION OF THE DRAWINGS

FIG. 1 shows a diagrammatic view of a vehicle safety system according to the invention;

FIG. 4 shows a diagrammatic illustration of a sensor according to the invention.

DETAILED DESCRIPTION OF THE PREFERRED EMBODIMENT

FIG. 1 shows a vehicle safety system with a steering wheel 10, in which a known gas bag module is held as part of a known gas bag system 11, which is not entered into further detail here.

Figure 2:
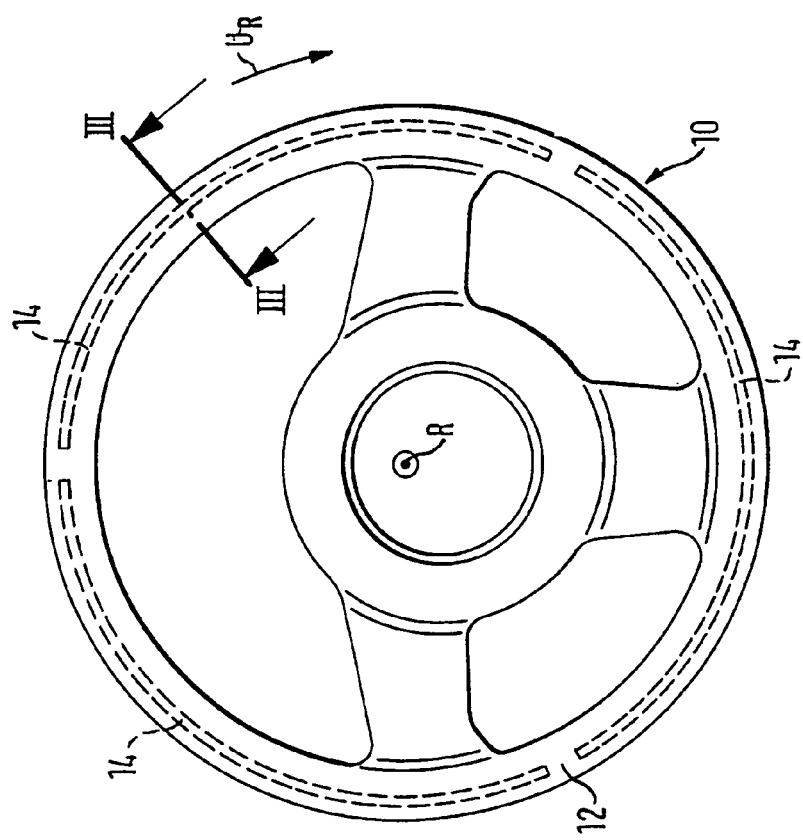
FIG. 2 shows a diagrammatic top view onto a steering wheel of a vehicle safety system according to the invention.
Figure 3:
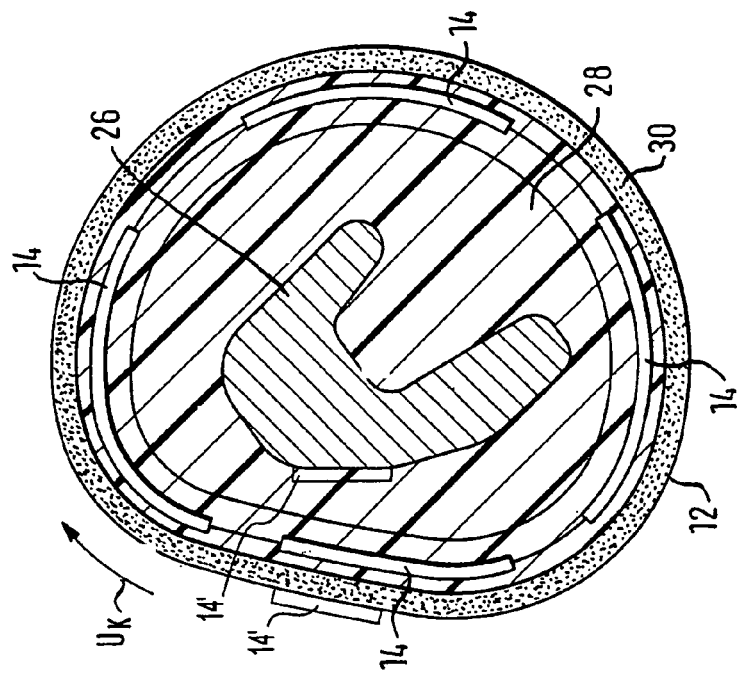
FIG. 3 shows a section along the line III-III' in FIG. 2.

Capacitive sensors 14, illustrated in further detail in FIGS. 2 to 4, are arranged in the steering wheel rim 12. The capacitive sensors 14 are part of a sensor arrangement which detects alterations to an electric or electromagnetic field 16. The sensors 14 transfer their data to a control unit 18, which together with the sensors 14 forms the sensor arrangement. The control unit 18 evaluates the sensor signals and thus establishes alterations to the field 16. The control unit 18 can also influence the generation of the electric or electromagnetic field 16. The field 16 can be generated either by the sensors 14 themselves or by known sources which are not illustrated.

Through the evaluation of the data transmitted by the sensors 14, it is detected whether and how a vehicle occupant, in this case the driver 20, is holding the steering wheel 10. For this, it is established with how many hands 24 the driver 20 is holding the steering wheel 10 and at which positions the hands 24 lie on the steering wheel rim 12.

Possibly also the position of his head 22 or upper body 23 and the distance of the respective parts of the body from the steering wheel 10 could be detected. In addition, it can be established whether the driver's body is resting on the steering wheel 10.

On the basis of these data, in the case of an accident a decision can be made by the control unit 18 as to whether, and if so to what extent, the gas bag contained in the gas bag module is to be unfolded.

Together with data from another system (e.g. of a pre-crash sensor), dangerous situations can be established and if applicable the necessary steps can be taken. This may, for example, be a warning signal for the driver 20.

In FIGS. 2 and 3, the arrangement of the capacitive sensors 14 in the steering wheel rim 12 is illustrated in further detail.

As can be seen in FIG. 3, the sensors 14 are arranged between a first cover 28 surrounding a skeleton 26 of the steering wheel 10 and a second cover 30 closing off the steering wheel 10 or the steering wheel rim 12 to the exterior. The first cover 28 is, for example, a PUR surrounding foam of the skeleton 26, whilst the second cover 30 is a flexible foam layer, or a leather or wood cover.

In the circumferential direction $U_K$ illustrated in FIG. 3, which describes the circumference of the steering wheel rim 12 in a radial section, several sensors 14 are provided, separated from each other along the circumference $U_K$. In this case, these are four sensors 14, but the number and arrangement can be varied by the specialist in the art according to the respective requirements.

Also in a circumferential direction $U_R$, shown in FIG. 2, situated perpendicular to the rotation axis R of the steering wheel 10, several sensors 14 are provided. The number and arrangement of the sensors 14 can be varied, too.

However, the arrangement is to be selected so that it is to be established whether none, only one or both hands 24 are holding the steering wheel rim 12 and whether the hands 24 are situated in the normal gripping position, i.e. to the left and right of the steering wheel hub.

Through the use of several sensors 14 a detection, in line with specific objectives, of the position of the hands 24 of the driver 20 and, if necessary, additionally also of his head 22 or upper body 23 is possible.

By evaluation of the signals of sensors 14 on opposite sides of the steering wheel rim 12, with respect to the rotation axis R, conclusions can be drawn regarding for example the position of the upper body 23 or of the head 22 of the driver 20 relative to the rotation axis R of the steering wheel 10. Likewise, the distance of the head 22 or of the upper body 23 of the driver 20 from the steering wheel 10 could be detected. The range of the capacitive sensors 14 must be selected accordingly.

The sensors 14 shown here consist principally of a fleece mat 32, into which electric leads 34 are interwoven. This is shown diagrammatically in FIG. 4.

This construction corresponds to that of a known heating mat which is used for steering wheel heating. Accordingly, it is also possible to construct sections of such a steering wheel heating arrangement as sensors 14, so that the leads are used as heating and at the same time as sensors.

The sensors 14 can be arranged simply between the first and the second cover 28, 30 and adapted to the geometry of the steering wheel rim 12. The driver is not aware of them through the second cover 30.

Of course, the use of any other suitable capacitive sensor is also possible. Sensors 14' can also be placed directly on the skeleton 26 or outside the second cover 30, as shown schematically in FIG. 3.

In the example shown here, the sensors 14 generate the electric or electromagnetic field 16. The field 16 may equally, however, also originate from an external source.

It would also be possible to arrange sensors 14 on the spokes of the steering wheel 10.

The invention claimed is:
1. A vehicle safety system, comprising
a vehicle steering wheel (10), which has a steering wheel rim (12), and
at least one capacitive sensor (14) which detects an alteration to an electric or electromagnetic field (16),
the sensor (14) being arranged in or on said steering wheel rim (12) and
the sensor (14) having a flexible fleece mat (32) with elongated electric leads (34) held therein.

* * * * *